United States Patent
Chen et al.

(10) Patent No.: US 7,376,932 B2
(45) Date of Patent: May 20, 2008

(54) XML-BASED TEXTUAL SPECIFICATION FOR RICH-MEDIA CONTENT CREATION—METHODS

(75) Inventors: Hua Chen, Ossining, NY (US); Shu-Chun Jeane Chen, San Diego, CA (US); Pierre Darmon, White Plains, NY (US); Shang Q. Guo, Tarrytown, NY (US); Keeranoor G. Kumar, Randolph, NJ (US); Edward C. Snible, New York, NY (US); Kshitij M. Vichare, Crompond, NY (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 09/727,524

(22) Filed: Dec. 4, 2000

(65) Prior Publication Data
US 2002/0143803 A1    Oct. 3, 2002

(51) Int. Cl.
  G06F 9/44  (2006.01)
  G06F 15/00 (2006.01)
  G06F 3/00  (2006.01)
  G06F 7/00  (2006.01)

(52) U.S. Cl. ............... 717/106; 717/100; 717/110; 717/114; 715/500; 715/513; 715/731; 715/732; 707/104.1

(58) Field of Classification Search ........ 717/100–119, 717/120, 168–174; 715/153, 501.1, 500–732; 707/1–104.1
See application file for complete search history.

(56) References Cited

U.S. PATENT DOCUMENTS

| | | | |
|---|---|---|---|
| 4,570,221 A * | 2/1986 | Martens | 711/158 |
| 5,425,138 A | 6/1995 | Kumakawa | 395/148 |
| 5,802,299 A | 9/1998 | Logan et al. | 395/200.48 |
| 5,845,073 A | 12/1998 | Carlin et al. | 395/200.47 |
| 5,907,837 A | 5/1999 | Ferrel et al. | 707/3 |
| 5,915,256 A | 6/1999 | Rogers et al. | 707/501 |

(Continued)

FOREIGN PATENT DOCUMENTS

WO    WO 98/34179    6/1998

OTHER PUBLICATIONS

U.S. Appl. No. 09/727,491 entitled "Automatic Multi-Stage Rich-Media Content Creation Using a Framework—Systems, Methods and Program Products", filed Dec. 4, 1999.

(Continued)

*Primary Examiner*—Meng-Al T. An
*Assistant Examiner*—Insun Kang
(74) *Attorney, Agent, or Firm*—Andre Gibbs

(57) ABSTRACT

Video, stills, panorama, sound and all forms of media as Rich Media in a Multimedia Vehicle Repository (MVR) file editable with a Rich Media Content description file. The Rich Media Content description file enables users to specify a vocabulary that defines the media elements and relations among the media elements thereby permitting the users to easily create and edit the Rich Media Content and compose various raw or compressed Rich Media components using any text editor. A multimedia authoring server side processor accepts the raw formatted Rich Media Content along with description text file in XML format and outputs the Rich Media, text and graphic components as an edited MVR file in accordance with user's design for execution on a multimedia player.

18 Claims, 4 Drawing Sheets

U.S. PATENT DOCUMENTS

| | | | |
|---|---|---|---|
| 5,928,323 A | 7/1999 | Gosling et al. | 709/203 |
| 5,987,480 A | 11/1999 | Donohue et al. | 707/501 |
| 5,995,091 A | 11/1999 | Near et al. | 345/302 |
| 5,999,939 A | 12/1999 | de Hilster et al. | 707/102 |
| 6,012,098 A | 1/2000 | Baych et al. | 709/246 |
| 6,018,749 A | 1/2000 | Rivette et al. | 707/525 |
| 6,078,924 A | 6/2000 | Ainsbury et al. | 707/101 |
| 6,083,276 A | 7/2000 | Davidson et al. | 717/71 |
| 6,175,820 B1 * | 1/2001 | Dietz | 704/235 |
| 6,317,151 B1 * | 11/2001 | Ohsuga et al. | 348/36 |
| 6,356,921 B1 * | 3/2002 | Kumar et al. | 715/501.1 |
| 6,397,219 B2 * | 5/2002 | Mills | 707/10 |
| 6,460,023 B1 * | 10/2002 | Bean et al. | 705/54 |
| 6,473,778 B1 * | 10/2002 | Gibbon | 715/501.1 |
| 6,564,368 B1 * | 5/2003 | Beckett et al. | 717/113 |
| 6,564,380 B1 * | 5/2003 | Murphy | 725/86 |
| 6,594,466 B1 * | 7/2003 | Harned et al. | 434/350 |
| 6,654,030 B1 * | 11/2003 | Hui | 715/720 |
| 6,735,583 B1 * | 5/2004 | Bjarnestam et al. | 707/2 |
| 6,781,609 B1 * | 8/2004 | Barker et al. | 715/760 |
| 7,162,691 B1 * | 1/2007 | Chatterjee et al. | 715/513 |
| 2002/0083433 A1 * | 6/2002 | Yamanaka | |

OTHER PUBLICATIONS

U.S. Appl. No. 09/268,537 entitled "Framework for Progressive Hierarchical and Adaptive Delivery of Rich Media Presentations and Associated Meta", filed Mar. 12, 1999.

"XML in 10 points", http://www.w3.org/XML/1999/XML-in-10-points, pp. 1-4, (Aug. 9, 2000).

Norman Walsh, "What is XML?", http:/www.xml.com/pub/98/10/guide1.html, pp. 1-6, (Oct. 3, 1998).

I.C. Rees, "What is xml?",http://www.geocities.com/SiliconValley/peaks/5957/wxml.html, pp. 1-5 (Aug. 29, 2000).

I.C. Rees, "learn xml in 11.5 minutes", rev. 1.2, http://www.geocities.com/SiliconValley/peaks/5957/10minxml.html, pp. 1-5 (Aug. 29, 2000).

* cited by examiner

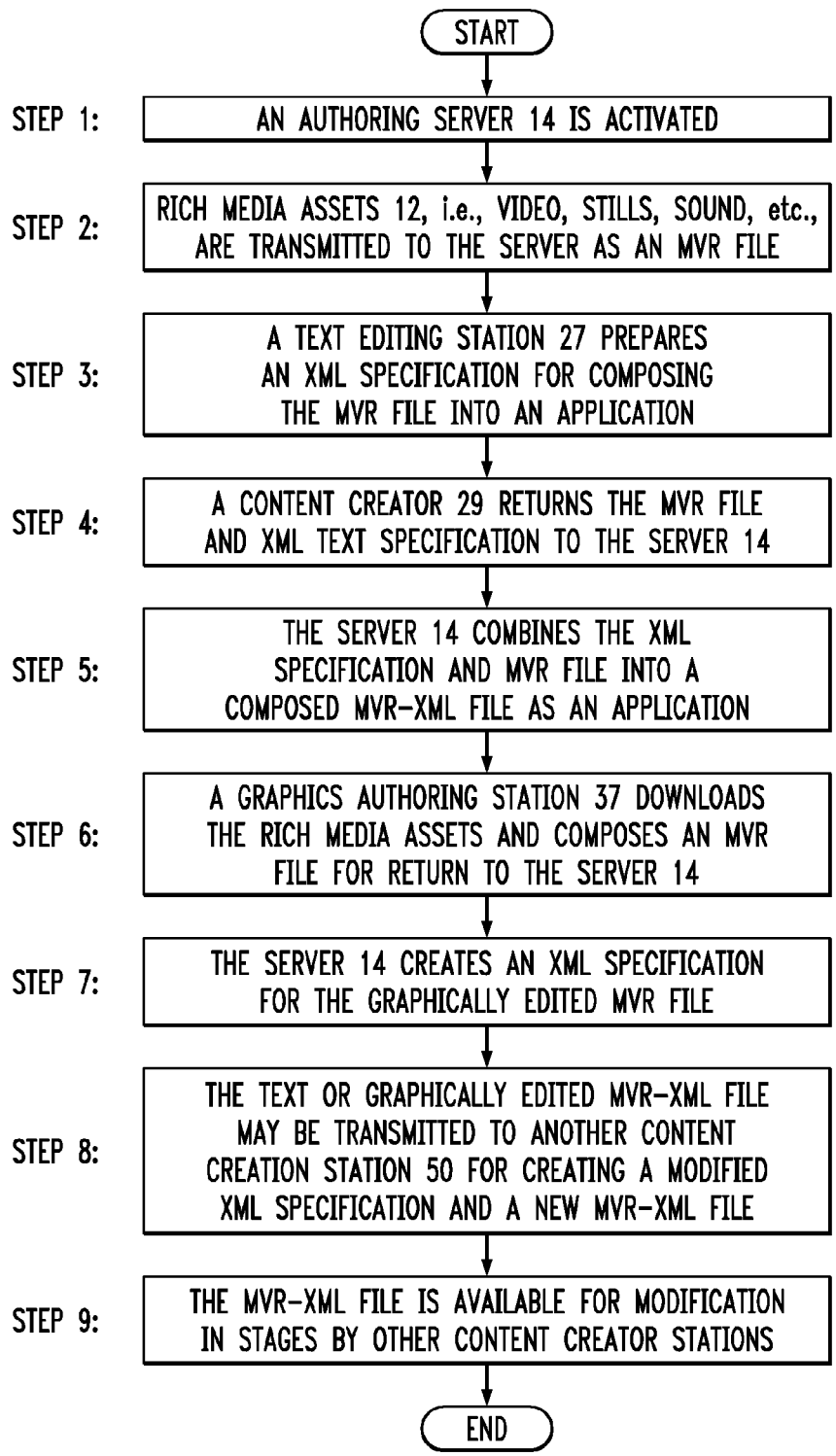

XML-BASED TEXTUAL SPECIFICATION FOR RICH-MEDIA CONTENT CREATION—METHODS

RELATED APPLICATION

Ser. No. 09/727,491 entitled "Automatic Multi-Stage Rich-Media Content Creation Using a Framework—Systems, Methods and Program Products", filed Dec. 4, 2000, assigned to the same assignee as that of the present invention and fully incorporated herein by reference.

BACKGROUND OF INVENTION

1. Field of Invention

This invention relates to a multi-media content creation systems, methods and program products. More particularly, the invention relates to textual based authoring systems, methods and program products for creating and managing editable Rich Media Content for application in ebusiness.

2. Background Discussion

Ser. No. 09/268,537 entitled "Framework for Progressive Hierarchical and Adaptive Delivery of Rich Media Presentations and Associated Meta", filed Mar. 12, 1999 (SE9-98-030), assigned to the assignee as that of present invention and fully incorporated herein by reference, describes a single, easy to use authoring environment, known as Hot-Media, for incorporating Rich Media in an ebusiness application. HotMedia lets an author create Rich Media Content, such as video, streaming audio synchronized with images, 3D, animations, panoramas in a single file that can be easily added to a web page. For fast delivery of Rich Media Content on a network, the data contained in a Rich Media file must be in a binary format. However, with a binary format, it is difficult for end users to understand the file structure, add new content or modify the content stored in the file outside the authoring tool. The binary specification also restricts data interchange among applications; open formats and definitions for expansion, and third party tool development. What is needed in the art is a straightforward and easy to understand means of creating and managing Rich Media Content for e-business applications. More specifically, a Rich Media Content creation system and method should include an authoring tool having a vocabulary that defines a media element and specifies the relations between media element; easily created and editable file contents, and enable various raw or compressed media components to be composed using any text editor. The file created by the authoring tool should be ideal for scripting; third party tools; expressing authoring templates; automatic and network authoring processes; multi-stage flow authoring and easy injection of non media (business) information into the file.

SUMMARY OF THE INVENTION

An object of the invention is a system, method, and program product for creating and managing Rich Media Content for web and other applications in a single, easy to use authoring environment.

Another object is a system, method and program product for creating and managing an editable Multi Media Vehicle Repository (MVR) file of Rich Media Content in a binary format.

Another object is a system, method and program product creating textual representation of an MVR file using an Extended Markup Language (XML) format.

Another object is a system, method and program product for creating an XML based MVR file (MVR-XML) file using any available textual editing tool.

Another object is a system, method and program product for combining raw media data in an MVR-XML file as a form of data interchange among other Rich Media Contents.

These and other objects, features and advantages are achieved by combining video, stills, panorama, sound and all forms of media as Rich Media in a Multimedia Vehicle Repository (MVR) file editable with a Rich Media Content description file. The Rich Media Content description file enables users to specify a vocabulary that defines the media elements and relations among the media elements thereby permitting the users to easily create and edit the Rich Media Content and compose various raw or compressed Rich Media components using any text editor. A multimedia authoring server side processor accepts the raw formatted Rich Media Content along with a description text file in XML format and outputs the Rich Media, text and graphic components as an MVR-XML file in accordance with user's design for execution on a multimedia player. The MVR-XML file may be readily altered by modifying the textual specification for the file using any text editor and authoring tool.

DESCRIPTION OF THE DRAWINGS

The invention will be further understood from the following detailed description of a preferred embodiment, taken in conjunction with an appended drawing, in which:

FIG. 4 is a flow diagram for creating the MVR file of FIG. 3.

DESCRIPTION OF PREFERRED EMBODIMENT

Figure 1:
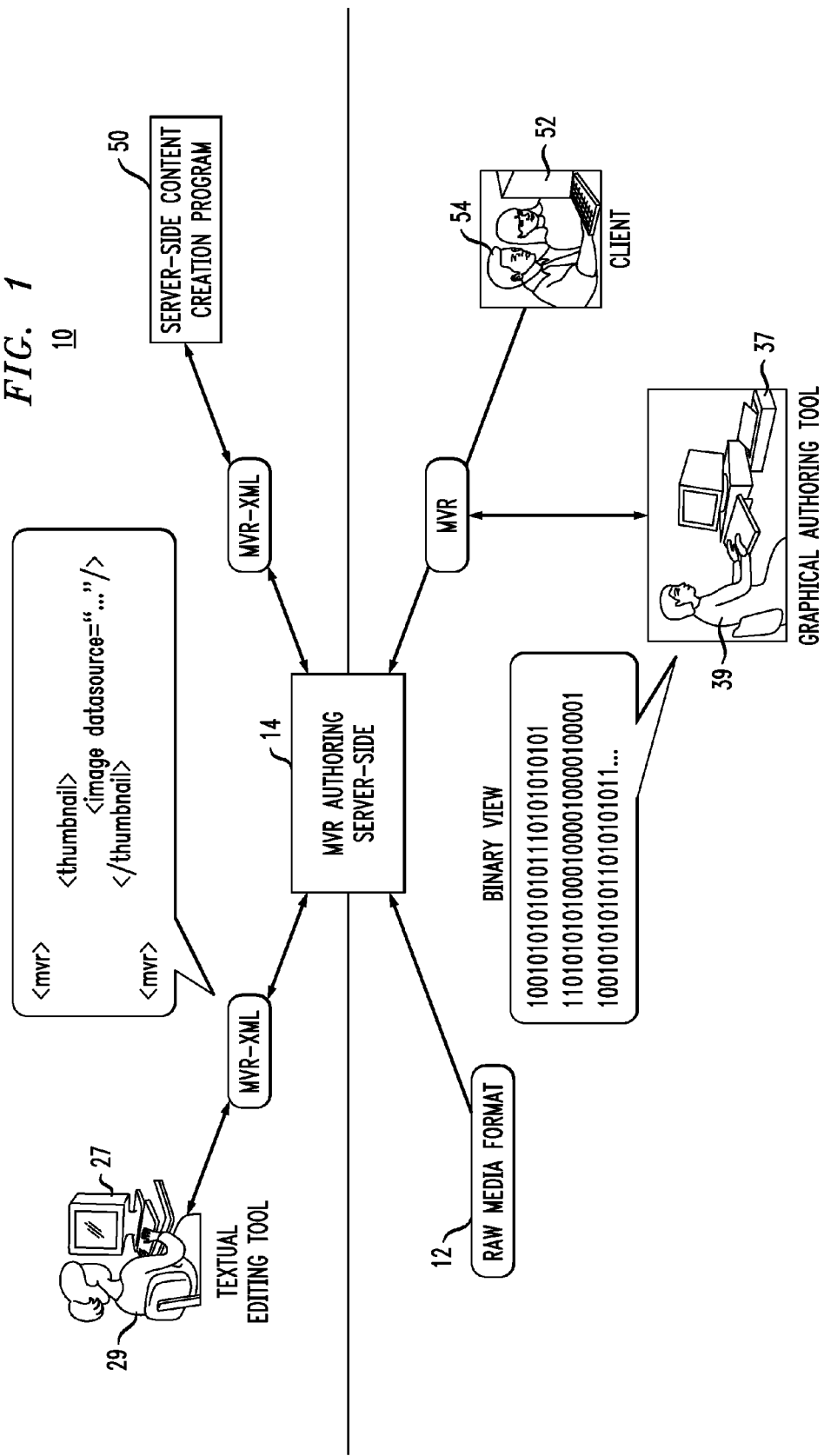
FIG. 1 is a representation of a server based system including an authoring tool for creating an XML based textual specification for Rich Media Content as a Multimedia Vehicle Repository (MVR) file in a binary format and incorporating the principals of the present invention.

In FIG. 1, a system 10 receives Rich Media assets 12, typically video, film, sound, panorama, stills or any form of multimedia in a streaming digital format and stores the assets in an authoring server 14 as a Multimedia Vehicle Repository (MVR). The Rich Media assets are stored in the MVR in an uneditable form for conversion into an editable sequence for various applications, e.g. film, advertisement, presentation or other application based upon a textual specification.

In one embodiment, the textual specification may be prepared using an Extended Markup Language (XML) for describing the combination of Rich Media assets as an application. XML is a set of rules, guidelines and conventions for designing text formats for binary data in a way that produces files that are unambiguous, easy to generate and read by a computer. The guidelines avoid common pitfalls such as lack of extensibility, lack of support for Internet/nationalization and platform dependency. XML is a W3C standard, published February 1998.

Figure 2:
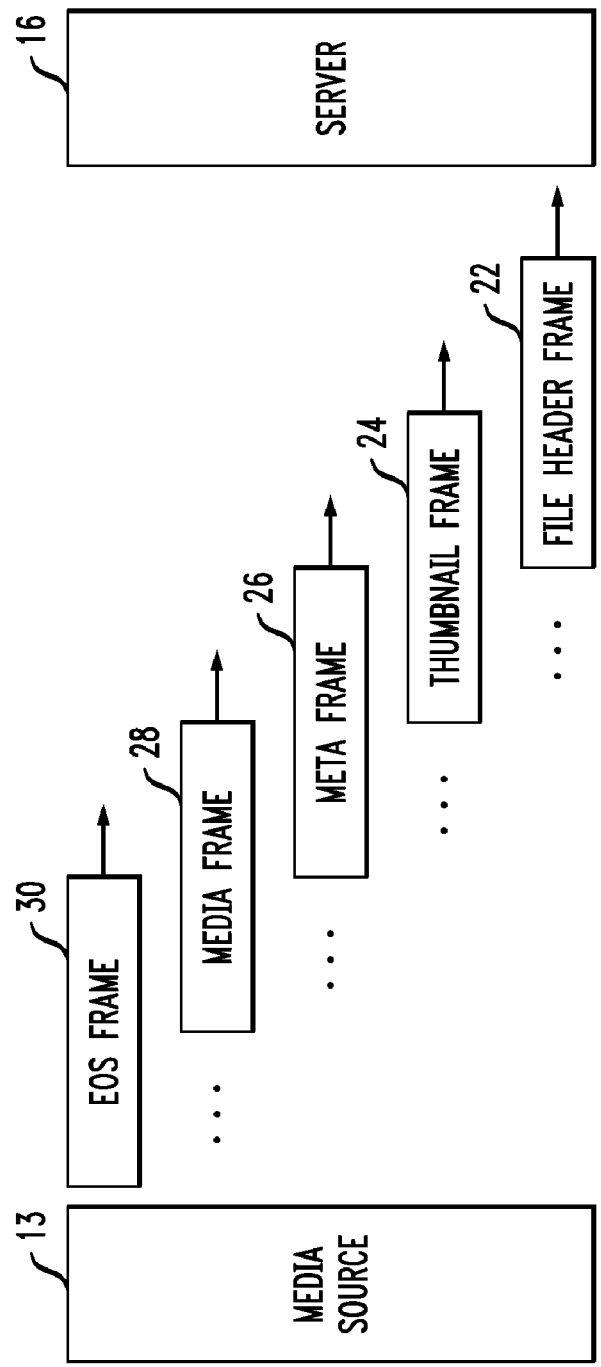
FIG. 2 is a representation of a streaming media frame for raw media assets incorporated into an MVR file in the system of FIG. 1.

In FIG. 2, the streaming media assets 12 are transmitted from a media source 13 to a server 16 in a framework including a file header frame 22, a thumbnail frame 24, a meta frame 26, a media frame 28 and an end of sequence frame 30. The header frame 22 includes a frame header which provides information about the frame size types, flags and frame level. The header frame also includes media information containing definition on different media tracks that may be contained in the file. For general information, the header frame provides the class name of the code that renders immediate type on the client station.

The thumbnail frame 24 carries a minimalist representation of the information in the framework. For example, if the information carried in the file were a description of merchandize the thumbnail would carry a single image. Thumbnail frame is made possible providing the user a quick introduction to the subject with minimal code and data transfer. The thumbnail frame will also carry parameters producing image pan and animation effects on a single image. A meta frame 26 carries specification of non-media specific information pertaining to enablement of hyperlink actions of media contents and tracking of media interaction.

Media frames 28 include a frame header and in addition contain media bitstreams initialization data, behavior data and code. The behavior data or initialization data defines the behavior in configuration of a corresponding media player. Media bitstreams data belong to a particular media track and can be carried over multiple frames and these frames can be interleaved with meta frames and frames that belong to other media tracks. Media frames are identified by frame type and track identifier. A frame type and track identifier enables true multiplex delivery for static or dynamic proportioning of various media tracks over limited bandwidth. Media frames can also contain codes that render a media type on the client station. The code in turn can be physically present or could be a URL reference. When present, the code is separated from the file on the server side and thereafter the code data can be made available for on-demand delivery. In the case of a URL reference to code, the code is sent from a remote HTTP server to be similarly made available on demand.

The end of sequence frame 30 contains 4 frame header and has a marker that signals the end of the entire presentation associated with the file.

The framework is further described in Ser. No. 09/268,537, supra.

Figure 3:
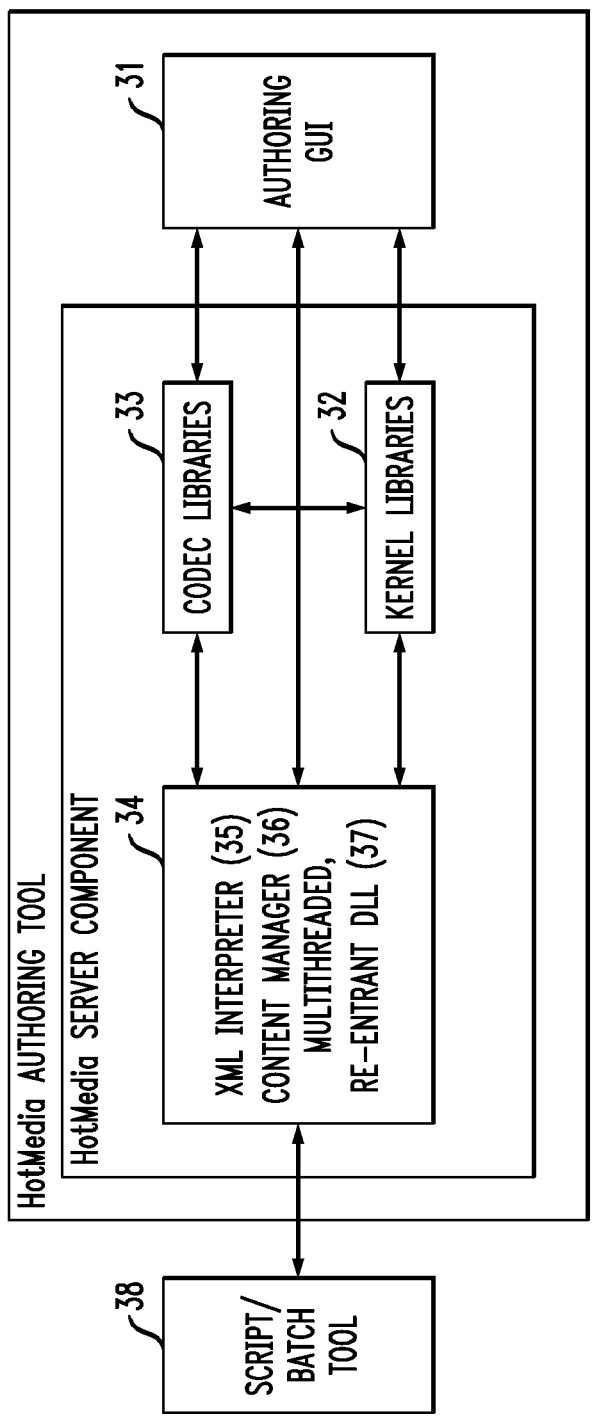
FIG. 3 is a representation of the network-based server in the system of FIG. 1.

In FIG. 3, the server 16, typically an IBM Apache web server, is linked through a network to other content creation stations. An authoring Graphical User Interface (GUI) 31 interacts with a kernel library 32, compression/decompression library 33, and processor programs 34 including an XML interpreter 35, a content manager 36, and a multi threaded re-entrant data link library 37. The processor programs 34 interact with a script/batch tool 38. The kernel library includes a server side MVR authoring tool which takes an XML specification along with raw media data or compressed media data as input to create a corresponding MVR-XML file. The codec library provides compression and decompression for the MVR-XML file. The script/batch tool 38 takes a template file prepared by an author and fills the template with actual data length provided the user to create the MVR-XML file. The service side content injection program 36 allows the user to add more information including non-media (business) to the MVR-XML file. The multithreaded, re-entrant data link library 37 enables an authoring session manager to multiplex creators/users linked through the network to access the MVR files on the server 14.

An authoring program combines an XML text file and an MVR file as a composed MVR file available for execution on a multimedia player. The program parses and renders XML instructions or tags contained within the XML text edited document. The instructions link the stored Rich Media assets as an application in the MVR file according to the textual specification prepared by a content creator.

Returning to FIG. 1, a text editing station 27 enables a content creator 29 to download the MVR file of Rich Media assets or an XML based MVR file (MVR-XML) from the server 14. Using any standard text editor, the content creator prepares an XML based textual specification and sends the specification to the server 14 along with the raw media assets or MVR files. The authoring program at server 14 combines the XML text description file and raw media assets or MVR file to generate a new MVR-XML file, as an application according to the content creator's desires.

Alternatively, a standard graphical authoring tool 37 may be used by a content creator 39 to assemble and edit the Rich Media assets into an MVR file and return to the server 14. The graphically edited MVR file can be translated into an XML text file or specification by the XML program stored in the server 14.

Another content creation station 50 may also download the MVR-XML file from the server 14 for re-editing of the XML text file and composing into another MVR-XML file by the authoring program either in the server 14 or in the server 50.

A client station 52 enables a user 54 to access the server 14 and view a composed MVR-XML file.

In FIG. 4, a process 400 is described in conjunction with FIGS. 1, 2 and 3 for creating an XML based MVR file, as follows:

Step 1: An authoring server 14 is activated to load and store an operating system, an XML program and an authoring or batch processing program.

Step 2: Rich Media assets 12, i.e. video, stills, sound, etc. are transmitted in digital format and composed and stored in the server as an MVR file.

Step 3: A text editing station 27 retrieves the MVR file from the server 14 and a content creator 29 using a standard editing tool prepares an XML specification for composing the MVR file into an application.

Step 4: The content creator 29 returns the MVR file and XML text specification to the server 14.

Step 5 The server 14 executes the authoring program and combines the XML specification and MVR file into a composed MVR-XML file as an application according to the XML text specification created by the content creator 29.

Step 6: A graphics authoring station 37 downloads the Rich Media assets and using a standard graphics authoring tool creates a composed MVR file for return to the server 14.

Step 7: The server 14 using the XML program creates an XML specification for the graphically edited MVR file.

Step 8: The text or graphically edited MVR-XML file may be transmitted to another content creation station 50 for creating a modified XML specification and a new MVR-XML file when the modified XML specification and MVR-XML file are processed by an authoring tool in the server 14 or 50.

Step 9: The MVR-XML file is available for modification in stages by other content creator stations creating a modified XML text specification for the MVR-XML file and processing by an authoring tool.

The invention has been described in a preferred embodiment. Various changes can be made in the embodiment without departing from the spirit and scope of invention, as defined in the appended claims, in which:

We claim:

1. A method of processing diverse rich media content, comprising the steps of:
    combining a plurality of diverse rich media content into a single multimedia content file for use as a first input to an authoring tool;
    creating a first extensible markup language (XML) based textual specification for use as a second input to the authoring tool, wherein the first XML-based textual specification comprises a user-specified vocabulary that defines one or more of the plurality of diverse rich media content and relationships between two or more of the plurality of diverse rich media content;
    combining the single multimedia content file and the first XML-based textual specification in accordance with the user-specified vocabulary and using the authoring tool to create a composed multimedia content file for execution on a multimedia player, wherein the composed multimedia content file is combined with at least one of an additional XML-based textual specification and an additional graphical edit of the plurality of diverse rich media content;
    editing the plurality of diverse rich media content using a graphical authoring tool;
    creating a second XML-based textual specification for the graphically edited diverse rich media content; and
    storing the composed multimedia content file and the second XML-based textual specification for access by one or more content creators.

2. The method of claim 1 further comprising the step of:
    editing at least one of the first and second XML-based textual specification by a user using a text editor.

3. The method of claim 1 wherein the step of creating at least one of the first and second XML-based textual specification further comprises the step of:
    using an XML program to create at least one of the first and second XML-based textual specification.

4. The method of claim 1 wherein the step of combining the single multimedia content file and the first XML-based textual specification further comprises the step of:
    executing a batch processing program to combine the single multimedia content file and the first XML-based textual specification.

5. The method of claim 1 further comprising the step of:
    transmitting the plurality of diverse rich media content as a streaming digital file.

6. The method of claim 1 further comprising the step of:
    downloading the composed multimedia content file for display to a user in an application.

7. The method of claim 5 wherein the step of transmitting the plurality of diverse rich media content as a streaming digital file further comprises the step of:
    generating the streaming digital file as a sequence of frames.

8. The method of claim 5 wherein the step of transmitting the plurality of diverse rich media content as a streaming digital file further comprises the step of:
    generating the streaming digital file as a binary file using a HotMedia format.

9. An authoring system for creating text based diverse rich media, comprising:
    a processor for receiving a plurality of diverse rich media;
    means for assembling the plurality of diverse rich media as a combined multimedia vehicle repository (MVR) file;
    means for automatically generating a first XML-based textual specification comprising a user-specified vocabulary that defines one or more of the plurality of diverse rich media and relationships between two or more of the plurality of diverse rich media;
    means for combining the MVR file and the first XML-based textual specification in accordance with the user-specified vocabulary to create a composed MVR file for execution on a multimedia player, wherein the composed MVR file is combined with at least one of an additional XML-based textual specification and an additional graphical edit of the plurality of diverse rich media content;
    means for editing the plurality of diverse rich media content using a graphical authoring tool;
    means for creating a second XML-based textual specification for the graphically edited diverse rich media content; and
    means for storing the composed MVR file and the second XML-based textual specification for access by one or more content creators.

10. The apparatus of claim 9 further comprising:
    a batch processing program running on the processor for combining the combined MVR file and the first XML-based textual specification as an edited MVR file.

11. The apparatus of claim 9 further comprising:
    an XML program running in the processor for translating descriptive text in combining the MVR file and the first XML-based textual specification.

12. An article of manufacture for processing diverse rich media content, comprising a machine storage medium containing one or more programs which when executed implement the steps of:
    combining a plurality of diverse rich media content into a single multimedia content file as a first input to an authoring tool;
    creating a first XML-based textual specification for use as a second input to the authoring tool, wherein the first XML-based textual specification comprises a user-specified vocabulary that defines one or more of the plurality of diverse rich media content and relationships between two or more of the plurality of diverse rich media content;
    combining the single multimedia content file and the first XML-based textual specification in accordance with the user-specified vocabulary and using the authoring tool to create a composed multimedia content file for execution on a multimedia player, wherein the composed multimedia content file is combined with at least one of an additional XML-based textual specification and an additional graphical edit of the plurality of diverse rich media content;
    editing the plurality of diverse rich media content using a graphical authoring tool;
    creating a second XML-based textual specification for the graphically edited diverse rich media content; and
    storing the composed multimedia content file and the second XML-based textual specification for access by one or more content creators.

13. The article of manufacture of claim 12 further comprising:
    enabling the editing of at least one of the first and second XML-based textual specification by a user using a text editor.

14. The article of manufacture of claim 12 further comprising:
    a batch processing program for combining the first XML-based textual specification and the single multimedia content file.

15. The article of manufacture of claim 12 further comprising: transmitting the plurality of diverse rich media content as a streaming digital file.

16. The article of manufacture of claim 12 further comprising:

downloading the composed multimedia content file for display to a user in an ebusiness application.

17. The article of manufacture of claim 15 further comprising:

generating the streaming digital file as a sequence of frames.

18. The article of manufacture of claim 15 further comprises: generating the streaming digital file as a binary file in a HotMedia format.

* * * * *